United States Patent
Niemi et al.

(10) Patent No.: US 10,506,541 B2
(45) Date of Patent: Dec. 10, 2019

(54) HANDLING OF NON-INTEGRITY PROTECTED REJECT MESSAGES IN 5G

(71) Applicant: MEDIATEK Singapore Pte. Ltd, Singapore (SG)

(72) Inventors: Marko Niemi, Oulu (FI); Matti Moisanen, Oulu (FI); Jarkko Eskelinen, Oulu (FI)

(73) Assignee: MEDIATEK Singapore Pte. Ltd., Singapore (SG)

(*) Notice: Subject to any disclaimer, the term of this patent is extended or adjusted under 35 U.S.C. 154(b) by 0 days.

(21) Appl. No.: 16/391,298

(22) Filed: Apr. 23, 2019

(65) Prior Publication Data

US 2019/0327699 A1    Oct. 24, 2019

Related U.S. Application Data

(60) Provisional application No. 62/661,221, filed on Apr. 23, 2018.

(51) Int. Cl.
*H04W 60/00* (2009.01)
*H04W 48/18* (2009.01)
*H04W 84/04* (2009.01)

(52) U.S. Cl.
CPC .......... *H04W 60/00* (2013.01); *H04W 48/18* (2013.01); *H04W 84/042* (2013.01)

(58) Field of Classification Search
CPC .............................. H04W 24/10; H04W 60/005
(Continued)

(56) References Cited

U.S. PATENT DOCUMENTS

| 2015/0072689 A1* | 3/2015 | Wu | H04W 36/0066 455/436 |
| 2017/0099338 A1* | 4/2017 | Yang | H04L 65/80 |

(Continued)

FOREIGN PATENT DOCUMENTS

| CN | 102457831 A | 10/2010 |
| CN | 107182109 A | 7/2017 |
| WO | WO2017135702 A | 2/2016 |

OTHER PUBLICATIONS

International Search Report and Written Opinion of International Search Authority for PCT/CN2019/083888 dated Jul. 23, 2019 (9 pages).

*Primary Examiner* — Kiet M Doan
(74) *Attorney, Agent, or Firm* — Imperium Patent Works; Helen Mao (57) ABSTRACT

Methods and apparatus are provided for handling of non-integrity reject message in the 5G system. In one novel aspect, the UE upon receiving the reject message via one access without integrity protection, retries one or more other accesses for one or more times before treating the rejection genuine. In one embodiment, the UE attempts the same 5GMM procedure over another access in the same cell/tracking area (TA). The alternative access including other types of 3GPP access and non-3GPP access. Subsequently, the UE can search the service from another cell/TA or another PLMN. In one embodiment, if the UE receives reject cause invalidating the UE with one access without integrity protection, the UE tries the system a few times before treating the reject genuine by tracking an invalidating counter, which is increased by one each time the rejection is received with a cause value invalidating the UE.

16 Claims, 5 Drawing Sheets (58) Field of Classification Search
USPC ...... 455/458, 436, 452.1, 574; 370/241, 236
See application file for complete search history.

(56) References Cited

U.S. PATENT DOCUMENTS

| | | | |
|---|---|---|---|
| 2018/0020417 A1 | 1/2018 | Catovic et al. | |
| 2018/0092142 A1* | 3/2018 | Han | H04W 16/14 |
| 2018/0317157 A1* | 11/2018 | Baek | H04W 76/11 |
| 2018/0324101 A1* | 11/2018 | Panchal | H04L 47/2475 |
| 2019/0045423 A1 | 2/2019 | Kumar et al. | |

* cited by examiner

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
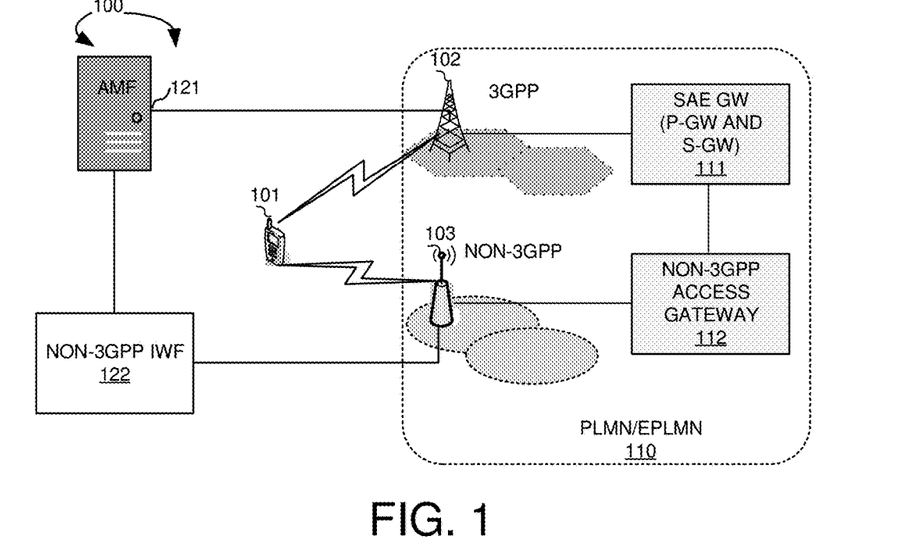
FIG. 1 illustrates an exemplary 5G system 100 with 3GPP and non-3GPP access in accordance with one novel aspect.

FIG. 1 illustrates an exemplary 5G system 100 with 3GPP and non-3GPP access in accordance with one novel aspect. 5G system 100 is a Public Land Mobile Network (PLMN) or an Equivalent Public Land Mobile Network (EPLMN) that supports one or more wireless radio network access (RAT) networks, including 3GPP networks, such a 5G, a 4G/LTE system, a 3G system, and possibly a 2G system (not shown). Each of the 3GPP system has a fixed base infrastructure unit, such as wireless communications stations 102, forming wireless networks distributed over a geographical region. The base unit may also be referred to as a next generation NodeB (gNB), an access point, an access terminal, a base station, a NodeB, an eNodeB, or by other terminology used in the art. The 3GPP wireless base station connects to access and mobility management function (AMF) unit 121 for control plane operations. 3GPP base station 102 connects with a system architecture evolution (SAE) gateway 111, which includes the serving gateway (S-GW) and the packet data network (PDN) gateway (P-GW) via the S1 interface. 3GPP base station 102 may also include a radio network controller (RNC). The RNC of the 3G system connects with a serving GPRS support node (SGSN), which is connected to SAE gateway 111. 5GS 100 may also have a non-3GPP base station 103. Each of the wireless communications stations 102 and 103 serves a geographic area. A non-3GPP base station may be a WiFi access point (AP). UE 101 connects with non-3GPP base station 103 via non-3GPP radio link protocols, such as the WiFi. Non-3GPP base station 103 connects with a non-3GPP interworking function (IWF) unit 122 for control plane communications. Non-3GPP base station 103 connects to non-3GPP access gateway 112 for data plane communication with the network. In the 5GS 100, a PLMN/EPLMN 110 may include the 3GPP network entities and non-3GPP network entities. The 3GPP network entities in a PLMN may also include different system protocols.

Figure 2:
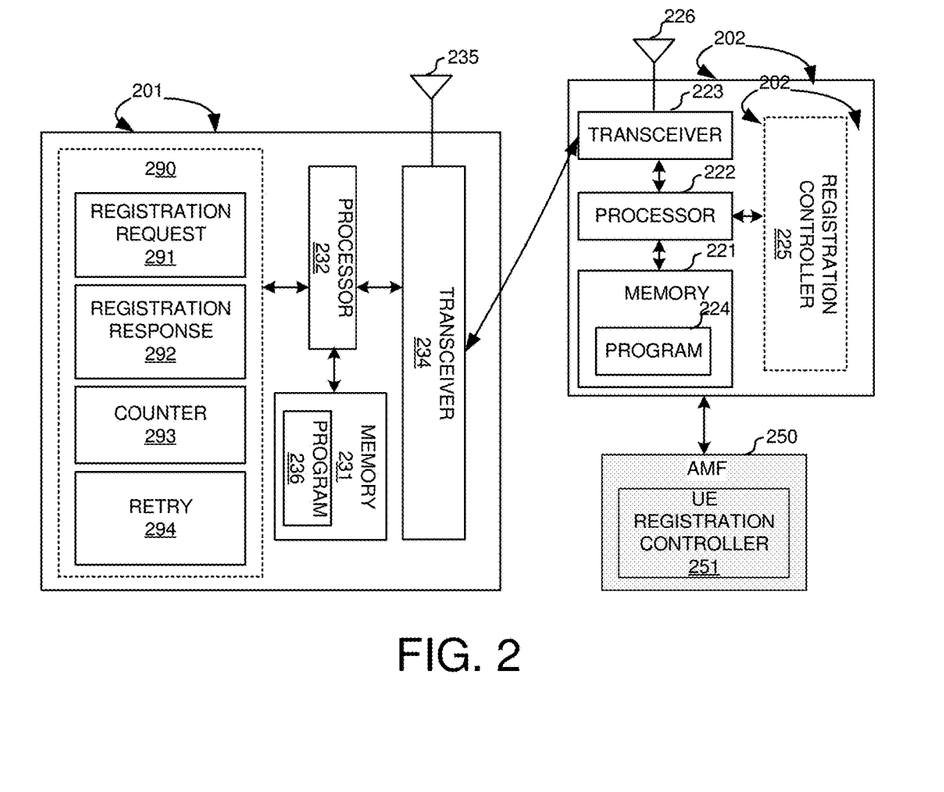
FIG. 2 illustrates simplified block diagrams of a user equipment and a base station in accordance with embodiments of the current invention.

FIG. 2 illustrates simplified block diagrams of a user equipment UE 201 and a base station BS 202 in accordance with embodiments of the current invention. BS 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in base station 202. Memory 221 stores program instructions and data 224 to control the operations of base station 202. Base station 202 also includes a set of control circuits, such as a registration controller 225 that carry out functional tasks for handling of non-integrity protected reject message in 5G. These functions can be implemented in software, firmware and hardware.

Similarly, UE 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in the mobile station 201. Memory 231 stores program instructions and data 236 to control the operations of the mobile station 201.

UE 201 also includes a set of control modules or circuits that carry out functional tasks. These functions can be implemented in software, firmware and hardware. A controller 290 supports handling of non-integrity protected reject message in 5G. A registration request circuit 291 transmits a Registration Request on a first access network with a first public land mobile network (PLMN), wherein the UE can access the 5GS core network (CN) through a plurality of access networks include one or more 3rd Generation Partner Project (3GPP) network and at least one non-3GPP network. A registration response circuit 292 receives a Registration Reject from the 5GS with a cause value indicating a non-integrity protected rejection invalidating the UE. A counter circuit 293 updates one or more corresponding rejection counters based on the first access network and the first PLMN, wherein each rejection counter counts a corresponding registration rejection received without integrity protection. A retry circuit 294 attempts a new Registration Request based on a registration rule, wherein the registration rule allows the new Registration Request with a selected access network and a selected PLMN upon determining one or more registration conditions are met based on a predefined registration selection criterion, and wherein the selection criterion allows also a non-3GPP network being selected.

As illustrated in FIG. 1, the 5GS system may use multiple access to the network including 3GPP access, such as E-UTRA and NR, and non-3GPP access, such as WiFi. The UE can connect to the network through different access system. In one novel aspect, when the UE receives non-integrity protected rejection messages, the UE will retry other accesses.

Figure 3:
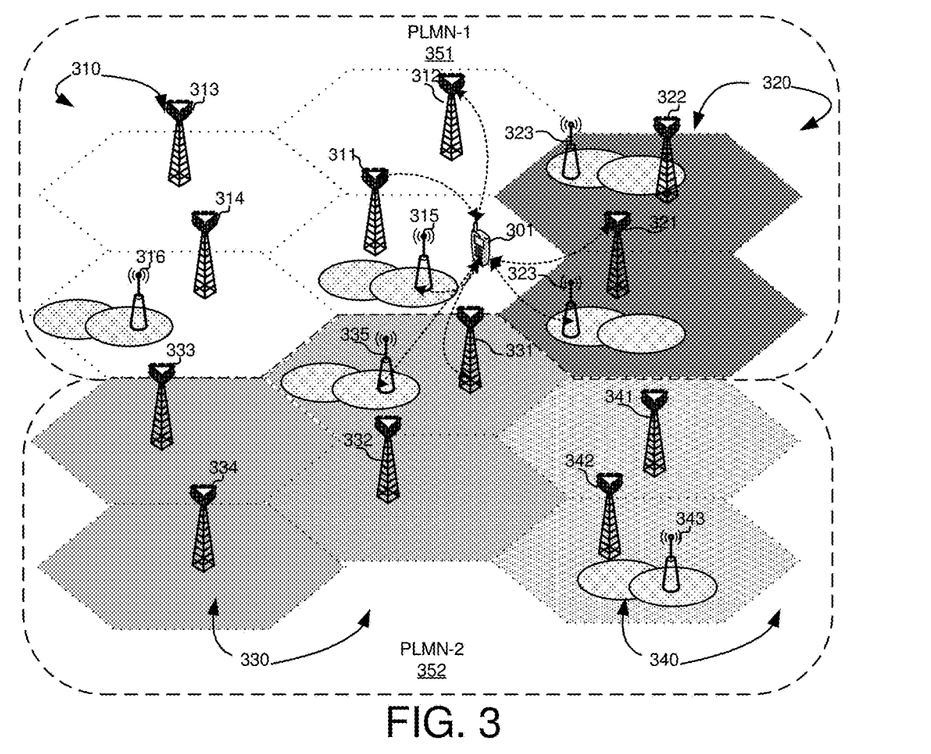
FIG. 3 illustrates exemplary diagrams for a 5G system with multiple access system and the UE access the network through different access system in accordance with embodiments of the current invention.

FIG. 3 illustrates exemplary diagrams for a 5G system with multiple access system and the UE access the network through different access system in accordance with embodiments of the current invention. A UE 301 is configured with access to a 5G system through multiple access systems including 3GPP network, such as E-UTRA and NR, and non-3GPP network. The exemplary 5G system is configured with multiple cells, each with one or more base stations serving each cell. The base station may be a 3GPP base station, such as base stations 311-314, 321-322, 331-334, and 341-342 or a non-3GPP base station/AP, such as 315, 316, 323, 335 and 343. The multiple base stations serving a geographic area may be overlapped too. One or more the serving cells form a tracking area. For example, tracking area 310 includes cells served by 3GPP base stations 311, 312, 313, 314 and non-3GPP APs 315 and 316. Similarly, tracking area 320 includes cells served by 3GPP base stations 321, 322, and non-3GPP AP 323. Tracking area 330 includes cells served by 3GPP base stations 331, 332, 334, and non-3GPP AP 335. Tracking area 340 includes cells served by 3GPP base stations 341, 342, and non-3GPP AP 343. A PLMN may be served by one or more tracking areas or one or more cells. For example, PLMN-1 351 includes tracking area 310 and 320. PLMN-2 352 includes tracking area 330 and 340. As an example, UE 301 can be served with 3GPP base stations 311 and 312 in tracking area 310, 321 in track area 320 and 331 in tracking area 330. UE 301 can also be served by non-3GPP base station/AP 315 in tracking area 310, 323 in tracking area 320, and 335 in tracking area 335.

As shown in FIG. 3, since the UE in 5GS can be accessed the core network over multiple accesses, such as E-UTRA, NR and non-3GPP, the handling of non-integrity protected reject message needs new considerations. The UE, upon receiving some fatal cause values that require the UE consider the USIM invalid and thus causing a total denial of service for the UE, needs to consider other access options first. The procedure for handling of the non-integrity protected reject messages needs to be modified for the 5G mobility management (5GMM) purposes. The existing EPS solution, which is designed against rogue cell operations over E-UTRA, requires improvement for the 5GS which allows multiple accesses, such as E-UTRA, NR and non-3GPP.

Figure 4:
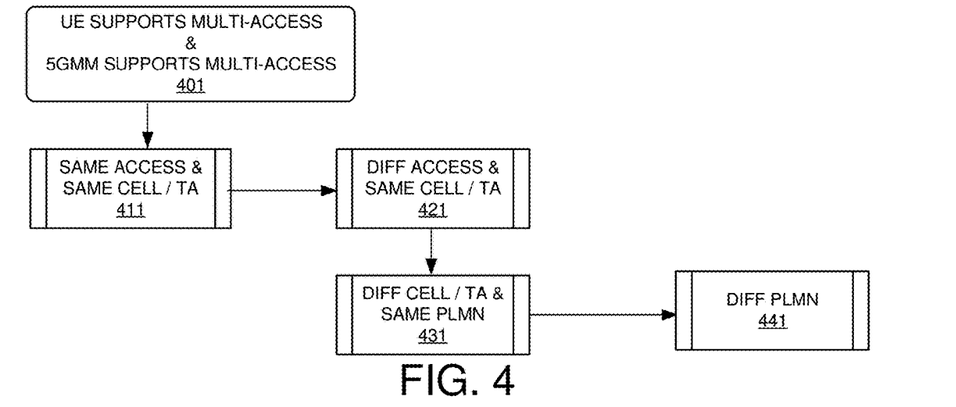
FIG. 4 illustrates an exemplary diagram for a retry procedure in handling the non-integrity protected reject message received by the UE in the 5GS in accordance with embodiments of the current invention.

FIG. 4 illustrates an exemplary diagram for a retry procedure in handling the non-integrity protected reject message received by the UE in the 5GS in accordance with embodiments of the current invention. In one novel aspect, the UE retries other accesses to the 5GS upon receiving non-integrity protected reject message. In one embodiment, if the UE attempted 5GMM procedure to the core network (CN) and receives reject cause #3, #6, #7, #8 (or another cause invalidating the UE) via one access without integrity protection and if the UE supports and the network offers an alternative access to the CN then allow the UE to try another access(es) few times before treating the reject genuine. This means that in the first phase the UE could attempt the same 5GMM procedure over another access in the same cell/TA, if the UE can determine that an alternative access to the CN is provided via the same cell/TA. Secondly the UE can search the service from another cell/TA and thirdly the UE can search another PLMN. In another embodiment, when the UE operating in 5GS can support also EPS, retries are performed through other accesses. If the UE attempted 5GMM procedure to the CN and receives reject cause #3, #6, #7, #8 (or another cause invalidating the UE) via one access without integrity protection and if the UE supports and the network offers also access to different system (EPS, or GERAN/UTRAN) then allow the UE to try the system few times before treating the reject genuine. In the 5GS system, reception of cause values #3, #6 (i.e. illegal UE/ME) in a 5GMM reject message requires the UE to consider the USIM invalid and this means a total denial of service when received from the network. Reception of cause #8 in a 5GMM reject message means the UE has no access to 5GS (N1 mode must be disabled) and the UE has to search other systems/accesses for service. If the UE does not support other than 5GS then this can mean also total denial of service. Other cause values in the 5GMM, which results in denial of service, may also need the retry procedure to protect the UE.

A retry procedure is configured for the UE upon receiving non-integrity protected reject message. The retry procedure can be configured with a priority rule for the target cell/base station for the retry. Such priority rule can be predefined or preconfigured. The priority rule can also be dynamically updated. The UE applies the priority rule based on the existing access of the UE to the network. First, at step 401, the UE determines that the UE supports multiple-access and the 5GMM supports multiple-access. The multiple-access supports includes supporting more than one access methods including an E-UTRA, an NR, and a non-3GPP access. Upon detecting a Registration Reject message from the network, the UE determines whether it is a non-integrity protected reject message with a preconfigured cause value, such as cause values #3, #6, #7, and #8. Other cause value may also trigger the retry procedure. The triggering value of the retry procedure can be preconfigured or predefined by the network or the operator. The triggering value of the retry procedure can also be dynamically updated. Upon detecting the non-integrity protected reject message with a preconfigured cause value, the UE applies a priority rule in selecting a retry target. At step 411, the UE first retry a base station with the same access and is in the same cell or in the same tracking area (TA). If step 411 fails to successfully register, the UE moves to step 421. At step 421, the UE retries with a different access in the same cell or the same TA. For example, if the UE is currently accessing the network with a 3GPP access, the UE first retry a base station with the same 3GPP access in the same cell or the same TA. If it fails to register, the UE would retry a base station with a different 3GPP access if there exists one, otherwise, the UE would retry a non-3GPP access. If step 421 fails, the UE, at step 431, would retry access with base station in a different cell or a different TA with the same PLMN. In step 431 fails, the UE, at step 441, would retry a base station with a different PLMN. In selecting a base station in a different cell, a different TA or a different PLMN, the UE would prioritize the same access as the original access over a different access.

The retry procedure in handling the non-integrity protected reject message for the UE in 5GS protects the UE against a denial of service attack. In one embodiment, one or more rejection counters are configured for the retry procedure. The UE updates the one or more rejection counters in the retry procedure upon each reception of non-integrity protected reject message. The UE resets the one or more rejection counters upon successful registration.

Figure 5:
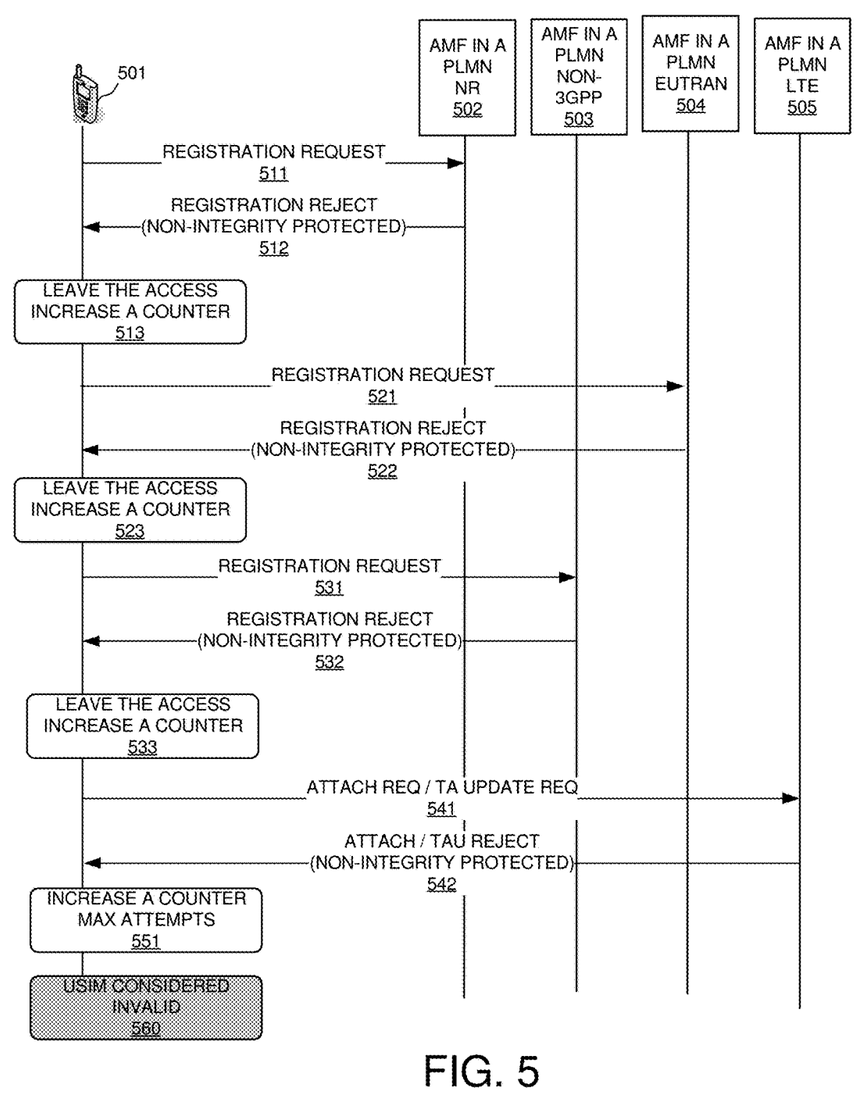
FIG. 5 illustrates an exemplary flow diagram for a UE retry procedure upon receiving non-integrity protected reject messages before the UE is considered invalid in accordance with embodiments of the current invention.

FIG. 5 illustrates an exemplary flow diagram for a UE retry procedure upon receiving non-integrity protected reject messages before the UE is considered invalid in accordance with embodiments of the current invention. A UE 501 in a 5GS is configured to access the CN through multiple accesses. The 5GS is configured with multiple accesses including 3GPP and non-3GPP accesses. UE 501 can access the 5GS CN via AMF 502 in a PLMN with NR, AMF 503 in a PLMN with non-3GPP, AMF 504 in a PLMN with EUTRAN, AMF 505 in a PLMN with LTE. At step 511, UE sends a registration request to AMF 502 with NR. At step 512, UE 501 receives Registration Reject from AMF 502 with NR. The Registration Reject message is non-integrity protected and the cause value is one selected from a predefined cause value set. The cause value set for 5GMM includes cause values #3, #6, #7, and #8. The cause value set may include other cause values. In one embodiment, the cause value set can be dynamically updated. Upon receiving the Registration Reject in step 512, the UE, at step 513, leaves the current access NR and increase a rejection counter by one. In one embodiment, the rejection counter is a counter tracking all registration reject message before a registration accept. In another embodiment, a separate rejection counter may also be configured for each type of access, or for each cell/TA/PLMN. At step 513, the UE determines if the maximum value of one or more rejection counter is reached. If not, the UE at step 521, sends a registration request to AMF 504 with EUTRAN. AMF 504 with EUTRAN is selected following a priority rule for selection, which is detailed and illustrated in FIG. 4. At step 522, the UE receives a non-integrity protected Registration Reject message. At step 523, UE 501 leaves access and increase a rejection counter. If each rejection counter is smaller than the preconfigured maximum value for each corresponding rejection counter, the UE selects another access for the retry. At step 531, the UE sends a Registration Request to AMF 503 with non-3GPP. At step 532, the UE receives a non-integrity protected message. At step 533, the UE leaves the non-3GPP access and increase one or more corresponding rejection counters. If each rejection counter is smaller than a corresponding maximum value for the rejection counter, the UE selects a new access for retry. At step 541, the UE sends a ATTACH REQUEST or a TRACKIGN AREA UPDATE (TAU) REQUEST to AMF 505 for LTE. At step 542, the UE receives a non-integrity protected ATTCHACH Reject message or a TAU REJECT message. At step 551, the UE increase one or more rejection counters and detects at least one rejection counter is greater than a maximum value for the rejection counter. Subsequently, at step 560, the UE considered the USIM invalid. In one embodiment, a invalidate counter is configured for the UE. UE only treats a rejection as being genuine until the invalidate counter is greater than or equal to a preconfigured maximum value of invalidate counter. The invalidate counter is updated/increased by one for each registration rejection with a cause value, such as cause value #3, #6, #7, or #8 in 5GMM, indicating a non-integrity protected rejection invalidating the UE.

Figure 6:
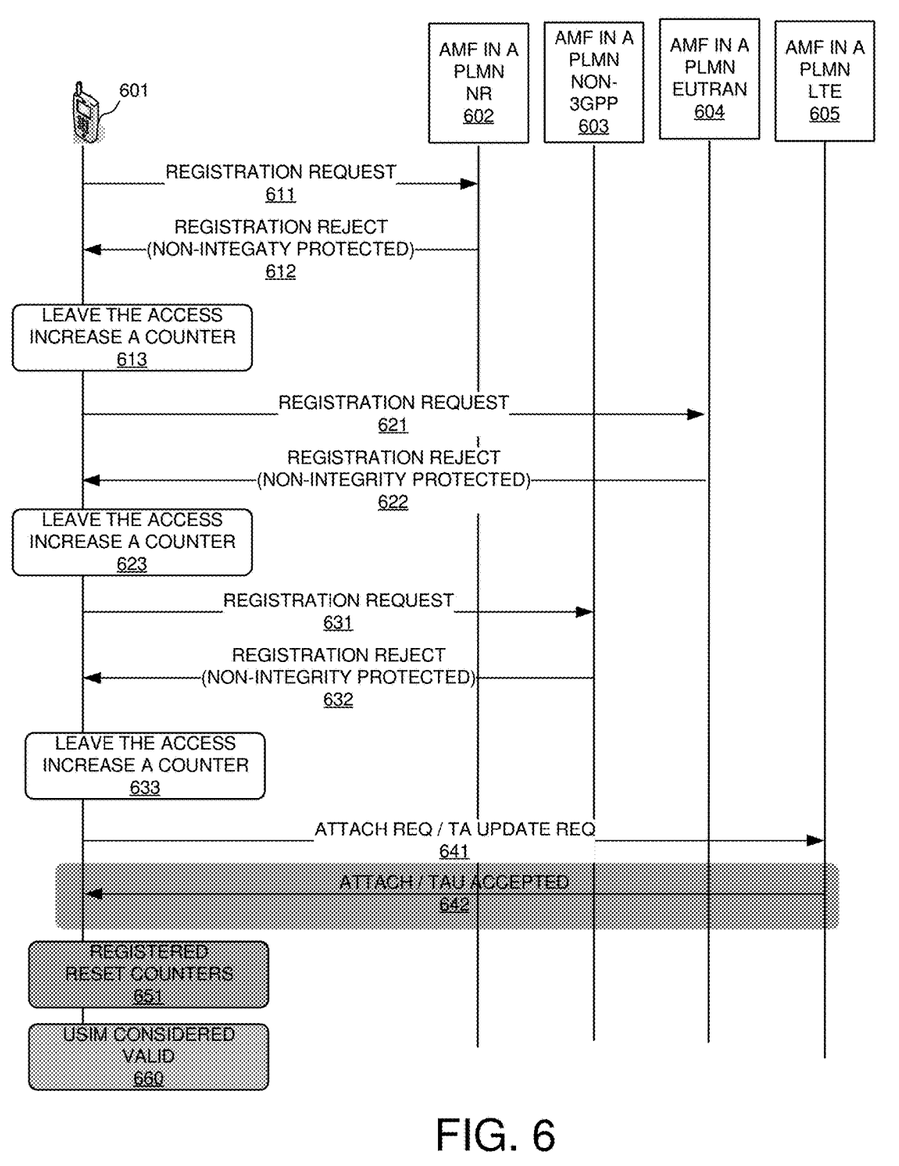
FIG. 6 illustrates an exemplary flow diagram for a UE retry procedure upon receiving non-integrity protected reject messages and succeeds in registration in accordance with embodiments of the current invention.

FIG. 6 illustrates an exemplary flow diagram for a UE retry procedure upon receiving non-integrity protected reject messages and succeeds in registration in accordance with embodiments of the current invention. A UE 601 in a 5GS is configured to access the CN through multiple accesses. The 5GS is configured with multiple accesses including 3GPP and non-3GPP accesses. UE 601 can access the 5GS CN via AMF 602 in a PLMN with NR, AMF 603 in a PLMN with non-3GPP, AMF 604 in a PLMN with EUTRAN, AMF 605 in a PLMN with LTE. At step 611, the UE sends registration request to AMF 602 with NR. At step 612, UE 601 receives Registration Reject from AMF 602 with NR. The Registration Reject message is non-integrity protected and the cause value is one selected from a predefined cause value set. The cause value set for 5GMM includes cause values #3, #6, #7, and #8. The cause value set may include other cause values. In one embodiment, the cause value set can be dynamically updated. Upon receiving the Registration Reject in step 612, the UE, at step 613, leaves the current access NR and increase a rejection counter by one. In one embodiment, the rejection counter is a counter tracking all registration reject message before a registration accept. In another embodiment, a separate rejection counter may also be configured for each type of access, or for each cell/TA/PLMN. At step 613, the UE determines if the maximum value of one or more rejection counter is reached. If not, the UE at step 621, sends a registration request to AMF 604 with EUTRAN. AMF 604 with EUTRAN is selected following a priority rule for selection, which is detailed and illustrated in FIG. 4. At step 622, the UE receives a non-integrity protected Registration Reject message. At step 623, UE 601 leaves access EUTRAN and increase a rejection counter. If each rejection counter is smaller than the preconfigured maximum value for each corresponding rejection counter, the UE selects another access for the retry. At step 631, the UE sends a Registration Request to AMF 603 with non-3GPP. At step 632, the UE receives a non-integrity protected Registration Reject message. At step 633, the UE leaves the non-3GPP access and increase one or more corresponding rejection counters. If each rejection counter is smaller than corresponding maximum value for the rejection counter, the UE selects a new access for retry. At step 641, the UE sends a ATTACH REQUEST or a TRACKIGN AREA UPDATE (TAU) REQUEST to AMF 605 for LTE. At step 642, the UE receives a ATTCHACH ACCEPT message or a TAU ACCEPT message. The UE is successfully registered with the 5GS through AMF 505 with LTE. At step 651, the UE resets all rejection counters. At step 660, the USIM is considered to be valid.

Figure 7:
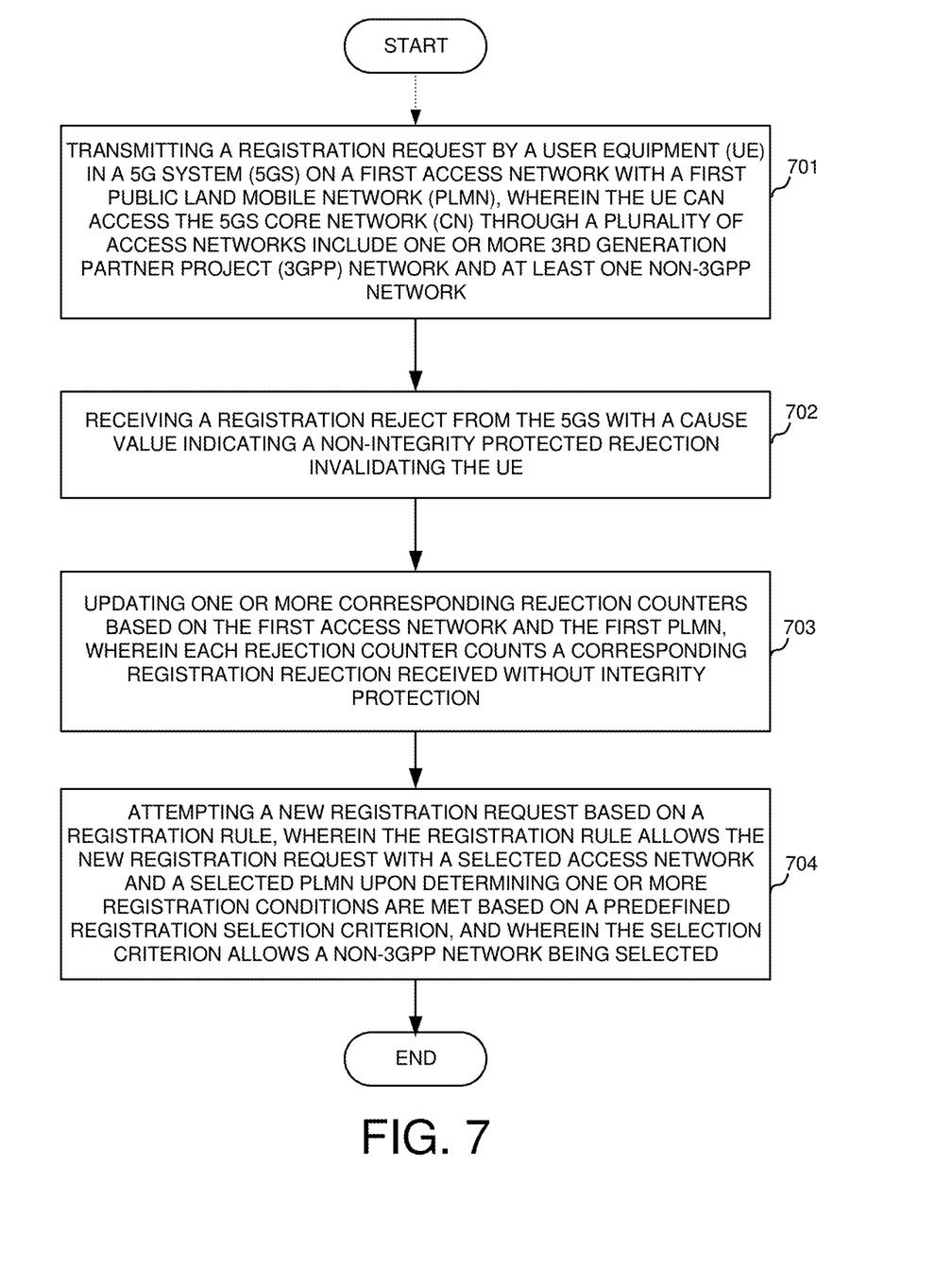
FIG. 7 illustrates an exemplary flow chart of the UE handling non-integrity protected rejection message in 5G system in accordance with embodiments of the current invention.

FIG. 7 illustrates an exemplary flow chart of the UE handling non-integrity protected rejection message in 5G system in accordance with embodiments of the current invention. At step 701, the UE transmits a Registration Request in a 5G system (5GS) on a first access network with a first PLMN, wherein the UE can access the 5GS core network (CN) through a plurality of access networks include one or more 3rd Generation Partner Project (3GPP) network and at least one non-3GPP network. At step 702, the UE receives a Registration Reject from the 5GS with a cause value indicating a non-integrity protected rejection invalidating the UE. At step 703, the UE updates one or more corresponding rejection counters based on the first access network and the first PLMN, wherein each rejection counter counts a corresponding registration rejection received without integrity protection. At step 704, the UE attempts a new Registration Request based on a registration rule, wherein the registration rule allows the new Registration Request with a selected access network and a selected PLMN upon determining one or more registration conditions are met based on a predefined registration selection criterion, and wherein the selection criterion allows a non-3GPP network being selected.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   transmitting a Registration Request by a user equipment (UE) in a 5G system (5GS) on a first access network with a first public land mobile network (PLMN), wherein the UE can access the 5GS core network (CN) through a plurality of access networks include one or more 3rd Generation Partner Project (3GPP) network and at least one non-3GPP network;

receiving a Registration Reject from the 5GS with a cause value indicating a non-integrity protected rejection invalidating the UE;

updating one or more corresponding rejection counters based on the first access network and the first PLMN, wherein each rejection counter counts a corresponding registration rejection received without integrity protection; and attempting a new Registration Request based on a registration rule, wherein the registration rule allows the new Registration Request with a selected access network and a selected PLMN upon determining one or more registration conditions are met based on a predefined registration selection criterion, and wherein the selection criterion allows a non-3GPP network being selected;

wherein the one or more rejection counters include a retry counter increased by one for each registration request sent by the UE; and wherein the registration condition includes the retry counter is smaller than a preconfigured maximum value of UE retry counter.

2. The method of claim 1, wherein the registration rule selects a qualified access network following a descending priority order comprising: selecting an available access network in a same cell or a same tracking area (TA) as the first access network, selecting an available access network in a different tracking area (TA) with a same PLMN as the first access network, and selecting an available access network in a different PLMN.

3. The method of claim 2, wherein the registration rule selects a qualified access network for the new registration request from in 5GS or evolved packet system (EPS) following a descending priority order comprising: a same access network, a different 3GPP access network, and a non-3GPP access network.

4. The method of claim 3, wherein a second access network is qualified if an updated rejection counter for the second access network is smaller than a preconfigured maximum value of registration for the second access network.

5. The method of claim 1, wherein the 5GS supports evolved packet system (EPS), and wherein the one or more rejection counters include an invalidate counter that is updated for each registration rejection with a cause value indicating a non-integrity protected rejection invalidating the UE.

6. The method of claim 5, wherein the UE only treats a rejection as being genuine until the invalidate counter is greater than or equal to a preconfigured maximum value of invalidate counter.

7. The method of claim 1, further comprising:
subsequently receiving a Registration Accept from the 5GS or evolved packet system (EPS); and
reset the one or more rejection counters.

8. The method of claim 1, wherein the non-3GPP access network is a WLAN network.

9. A user equipment (UE), comprising:
one or more radio frequency (RF) transceivers that transmits and receives radio signals in one or more corresponding radio networks in a 5G system (5GS);

a registration request circuit that transmits a Registration Request on a first access network with a first public land mobile network (PLMN), wherein the UE can access the 5GS core network (CN) through a plurality of access networks include one or more 3rd Generation Partner Project (3GPP) network and at least one non-3GPP network;

a registration response circuit that receives a Registration Reject from the 5GS with a cause value indicating a non-integrity protected rejection invalidating the UE;

a counter circuit that updates one or more corresponding rejection counters based on the first access network and the first PLMN, wherein each rejection counter counts a corresponding registration rejection received without integrity protection; and a retry circuit that attempts a new Registration Request based on a registration rule, wherein the registration rule allows the new Registration Request with a selected access network and a selected PLMN upon determining one or more registration conditions are met based on a predefined registration selection criterion, and wherein the selection criterion allows a non-3GPP network being selected;

wherein the one or more rejection counters include a retry counter increased by one for each registration request sent by the UE; and wherein the registration condition includes the retry counter is smaller than a preconfigured maximum value of UE retry counter.

10. The UE of claim 9, wherein the registration rule selects a qualified access network following a descending priority order comprising: selecting an available access network in a same cell or a same tracking area (TA) as the first access network, selecting an available access network in a different tracking area (TA) with a same PLMN as the first access network, and selecting an available access network in a different PLMN.

11. The UE of claim 10, wherein the registration rule selects a qualified access network for the new registration request from in 5GS or evolved packet system (EPS) following a descending priority order comprising: a same access network, a different 3GPP access network, and a non-3GPP access network.

12. The UE of claim 11, wherein a second access network is qualified if an updated rejection counter for the second access network is smaller than a preconfigured maximum value of registration for the second access network.

13. The UE of claim 9, wherein the 5GS supports evolved packet system (EPS), and wherein the one or more rejection counters include an invalidate counter that is updated for each registration rejection with a cause value indicating a non-integrity protected rejection invalidating the UE.

14. UE of claim 13, wherein the UE only treats a rejection as being genuine until the invalidate counter is greater than or equal to a preconfigured maximum value of invalidate counter.

15. The UE of claim 9, wherein registration response circuit subsequently receives a Registration Accept from the 5GS, and the counter circuit resets the one or more rejection counters.

16. The UE of claim 9, wherein the non-3GPP access network is a WLAN network.

* * * * *